United States Patent [19]

Gill et al.

[11] Patent Number: 5,027,243
[45] Date of Patent: Jun. 25, 1991

[54] SELF-INITIALIZATION OF SHORT MAGNETORESISTIVE SENSORS INTO A SINGLE DOMAIN STATE

[75] Inventors: Hardayal S. Gill, Los Altos; James A. Brug, Palo Alto, both of Calif.

[73] Assignee: Hewlett-Packard Company, Palo Alto, Calif.

[21] Appl. No.: 441,689

[22] Filed: Nov. 27, 1989

[51] Int. Cl.$^5$ ............................................. G11B 5/39
[52] U.S. Cl. .................................. 360/113; 324/252; 338/32 R
[58] Field of Search .................. 360/113; 324/252; 338/32 R

[56] References Cited

U.S. PATENT DOCUMENTS

| | | | |
|---|---|---|---|
| 4,142,218 | 2/1979 | Gorter | 360/113 |
| 4,418,372 | 11/1983 | Hayashida et al. | 360/113 |
| 4,802,043 | 1/1989 | Sato et al. | 360/113 |
| 4,896,235 | 1/1990 | Takino et al. | 360/113 |

Primary Examiner—John H. Wolff
Assistant Examiner—Craig A. Renner

[57] ABSTRACT

A a dual element magnetoresistive sensor that uses the longitudinal field produced by the sense/bias currents to initialize the elements into a stable antiparallel state. The dual element magnetoresistive sensor comprises two magnetoresistive elements having first and second conductors coupled thereto. The first and second conductors are oriented in the same direction as the magnetoresistive elements in their contact areas. A third conductor is disposed between and coupled to the two magnetoresistive elements at their opposite ends. The third conductor is oriented transverse to the directions of the first and second sensor elements, and is adapted to conduct current therethrough in a direction transverse to the currents conducted by the first and second conductors. Currents conducted by all three conductors self-initialize the magnetoresistive elements into a single domain state. Also, the current flowing in the third conductor creates an anti-parallel longitudinal field in the two sensor elements that is oriented in the same direction as closure fields present in the magnetoresistive elements. These fields ensure that a single domain state is produced in the magnetoresistive elements. An alternative design for the third conductor employs one conductor portion that provides a current distribution that initializes the sensor. This current distribution initializes the sensor. Another conductor portion is used during reading and provides a current distribution that is similar to the distribution produced by the first and second conductors. This ensures that the across-the-track response is symmetric. A small fraction of the sense current flows in the initializing conductor portion to provide stabilization during reading.

2 Claims, 1 Drawing Sheet

SELF-INITIALIZATION OF SHORT MAGNETORESISTIVE SENSORS INTO A SINGLE DOMAIN STATE

BACKGROUND

The present invention relates generally to magnetoresistive sensors, and more particularly, to the self initialization of short magnetoresistive sensors into a single domain state.

It has long been recognized that instability in magnetoresistive sensors is produced by multiple domain states. In the past it has often been necessary to enhance stability by initializing the magnetoresistive sensor into a single domain state prior to operation by the application of an external longitudinal field of sufficient strength to saturate the sensor.

This conventional technique has numerous problems. The initialization only occurs during manufacture and not in the disc drive itself. Multiple domain states are produced during operation by large fields produced by the head during writing, or by fields from the disc itself. Stray fields that might occur during shipping or assembly also produce multiple domain state. These states often remain during normal operation of the head and cause instability. In addition, because the magnetoresistive sensor is shielded, it may be difficult to produce a strong enough field to entirely remove all of the domains from the sensor.

In coupled magnetic films, such as those present in dual element sensors, the most stable state is to have the magnetization associated with one element antiparallel to the other element. However, an external field can only produce parallel alignment of the magnetizations. Under the influence of the write field, or stray fields, this state may relax to the antiparallel state. During this relaxation, or afterwards, a multiple domain state may be produced.

Typical conventional structures are described in "Magnetic Self-Bias in the Barber Pole Structure," by J. S. Y. Feng et al., in IEEE Transactions on Magnetics, Vol. MAG-13, No. 5, September 1977, "The Design of Magnetoresistive Multitrack READ Heads for Magnetic Tapes," by Werner Metzdorf et al., in IEEE Transactions on Magnetics, Vol. MAG-18, No. 2, March 1982, "A specific model for domain-wall nucleation in thin-film Permalloy microelements," by Neil Smith, in Journal of Applied Physics, Vol 83, No. 8, April 15, 1988, and "Study of domain formation in small permalloy magnetoresistive elements," by C. Tsang et al. in Journal of Applied Physics, Vol 52, No. 38, March 1982.

One conventional technique enables a longitudinal field to be applied to the magnetoresistive element directly by the sense/bias current (see the Feng et al. article cited above). In test samples substantiating that invention it was found that the stabilizing fields produced by the sense/bias current in conjunction with a uniform saturating transverse field are capable of reorienting the magnetization in a single magnetoresistive element producing a stable magnetoresistive response. However, the structure that applies the longitudinal field is not able to completely guarantee a single domain state in the magnetoresistive element for a number of reasons.

The longitudinal fields favor a parallel alignment of the magnetization so that at the ends of the magnetoresistive element the lack of closure will introduce a multiple domain state. To minimize this effect the magnetoresistive elements are made relatively long compared with the active area so that the end domains are far away from the active area. The possibility exists that, under the influence of stray fields, the multiple domains could come sufficiently close to the active area to affect the stability of the device.

The region over which the stabilizing longitudinal field is strong is relatively close to the active area. Areas away from the active area are only stabilized by the exchange coupling of the magnetization in the element. If these outside regions were affected by stray fields from adjacent tracks, or in anyway become multidomain, then the magnetization in the active area could be affected by the exchange coupling of the magnetization in the element.

SUMMARY OF THE INVENTION

In order to overcome the above-mentioned limitations of conventional magnetoresistive sensors, the present invention provides for a dual element magnetoresistive sensor that uses the longitudinal field produced by the sense/bias currents to initialize the elements into a stable antiparallel state.

The dual element magnetoresistive sensor comprises first and second parallel magnetoresistive sensor elements separated by dielectric material. First and second conductors are respectively coupled to one end of each of the first and second magnetoresistive sensor elements and are oriented in the same direction thereas in the coupling areas thereof. The first and second conductors are adapted to conduct currents therethrough in the same direction. A third conductor is disposed at the opposite ends of the first and second magnetoresistive sensor elements and is coupled to both sensor elements. The third conductor is oriented transverse to the directions of the first and second sensor elements, and is adapted to conduct current therethrough in a direction transverse to the currents conducted by the first and second conductors.

Accordingly, currents conducted by all three conductors self-initialize the magnetoresistive elements into a single domain state. Also, the current flowing in the third conductor creates an anti-parallel longitudinal field in the two sensor elements that is oriented in the same direction as closure fields present in the magnetoresistive elements. These fields ensure that a single domain state is produced in the magnetoresistive elements.

The sense/bias current in the third conductor produces a longitudinal field that is in opposite directions in each of the two magnetoresistive elements. Initialization of the sensor into an antiparallel state occurs due to the combined effects of a transverse field that occurs when the write coil is excited and the longitudinal field induced by the third conductor. This antiparallel alignment favors a single domain state because the closure between the two magnetoresistive elements at the second ends thereof favors this state. During reading, the longitudinal field stabilizes the single domain state against perturbations caused by fields from the disc being read. The shape of the two conductors is such that the sense/bias current is along the easy axis of the magnetoresistive elements. No longitudinal field is produced by the first or second conductors to interfere with the longitudinal bias produced by the third conductor.

An alternative design for the third conductor employs one conductor portion that provides a current distribution that is similar to that described above. This current distribution initializes the sensor. Another conductor portion is used during disc reading and provides a current distribution that is similar to the distributions produced by the first and second conductors, which are located on the other side of the track. This ensures that cross track response is symmetric. Furthermore a small fraction of the sense current may be caused to flow in the initialization lead to provide stabilization during reading.

The advantages of the invention are such that the design of the magnetoresistive elements and sense/bias conductors allow them to be self-initialized into a single domain state during normal operation of a disc drive incorporating them. The antiparallel longitudinal field produced by the sense/bias current in the third conductor is in the same direction as the closure fields in the dual element magnetoresistive sensor. These fields ensure that the single domain state is produced in the magnetoresistive elements which leads to enhanced stability and initialization capability. The reduction of end domains enables short magnetoresistive elements to be employed. These short elements provide the ability to control track width definition and across-the-track pickup in high density disc drives.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
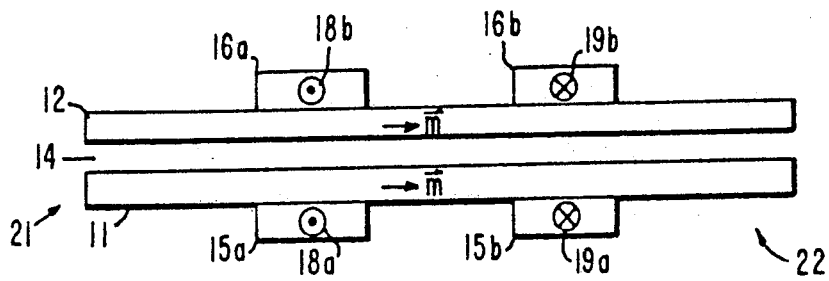
FIGS. 1 and 2 show side and top views, respectively, of a convention unstabilized dual element magnetoresistive sensor.
Figure 2:
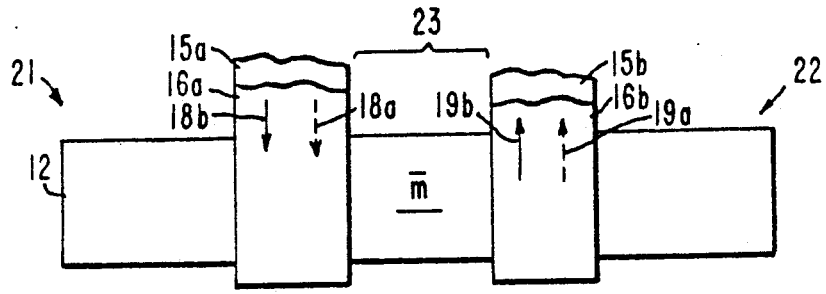

Referring now to the drawings, FIG. 1 shows a side view of a conventional unstabilized dual element magnetoresistive sensor 10, while FIG. 2 shows a top view thereof. The unstabilized dual element magnetoresistive sensor 10 comprises two magnetoresistive elements 11, 12 separated by dielectric material 14. Disposed on respective distal opposed surfaces of the two magnetoresistive elements 11, 12 are two pairs of conductors 15a, 15b, 16a, 16b. The positions and shapes of the two pairs of conductors 15a, 15b, 16a, 16b are such that currents flow through them in the directions of the encircled dots 18a, 18b and crosses 19a, 19b in FIG. 1. The encircled dots 18 indicate current flow out of the plane of the drawing, while the encircled crosses indicate current flow into the plane of the drawing.

It may be seen that in this design, the longitudinal fields favor a paralled alignment of the magnetization M so that, at the opposite ends 21, 22 of the magnetoresistive elements 11, 12, the lack of closure thereof introduces a multiple domain state. To minimize this effect, the conventional magnetoresistive elements 11, 12 are made relatively long compared with the active area 23 of the sensor 10 so that the end domains are far away from the active area 23. Under the influence of stray fields, the multiple domain states may exist sufficiently close to the active area 23 to affect the stability of the device. The region over which the stabilizing longitudinal field is strong and is relatively close to the active area 23. Areas away from the active area 23 are only stabilized by the exchange coupling of the magnetization in the magnetoresistive elements 11, 12. If these outside regions are affected by stray fields from adjacent tracks of an underlying disc, or in any way become multidomain, then the magnetization in the active area 23 may be affected by the exchange coupling of the magnetization M in the magnetoresistive elements 11, 12.

Figure 3:
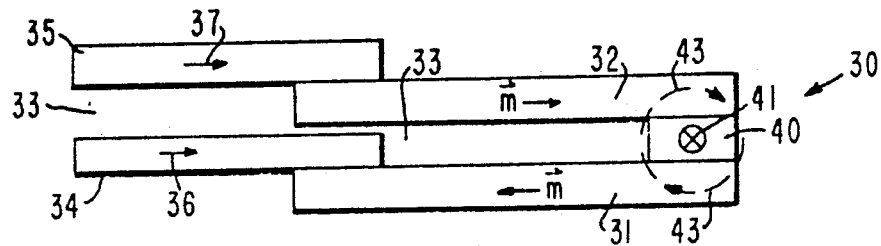
FIGS. 3 and 4 show side and top view, respectively, of a dual element magnetoresistive sensor in accordance with the principles of the present invention.
Figure 4:
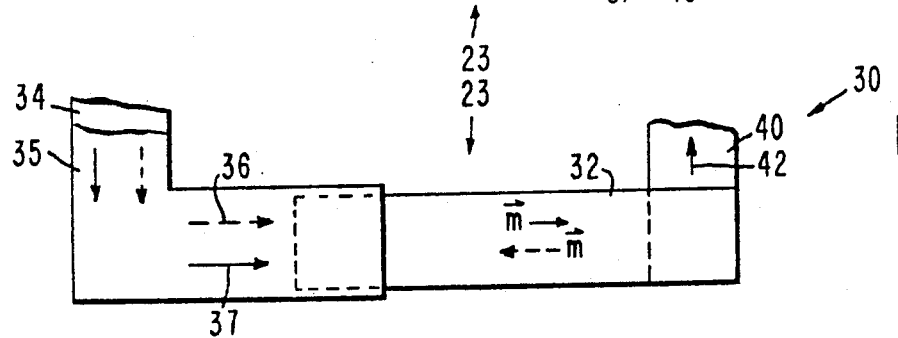

In order to overcome the problems inherent in conventional sensors 10, FIG. 3 shows a side view of a dual element magnetoresistive sensor 30 in accordance with the principles of the present invention, while FIG. 4 shows a top view thereof. The dual element magnetoresistive sensor 30 comprises first and second parallel magnetoresistive elements 31, 32 that are separated by dielectric material 33. The first and second magnetoresistive elements 31, 32 are relatively short compared with the magnetoresistive elements 11, 12 shown in FIGS. 1 and 2. The first and second magnetoresistive elements 31, 32 are oriented substantially parallel to each other. The magnetoresistive elements 31, 32 are typically comprised of a nickel-iron-cobalt composition and are separated by a distance of from 50-150 nanometers.

A first current conductor 34 is coupled to the first magnetoresistive element 31, while a second current conductor 35 is coupled to the second magnetoresistive element 32 at respective first ends thereof. The first and second conductors 34, 35 are typically comprised of gold, aluminum or copper, for example. The first and second magnetoresistive elements 31, 32 are adapted to provided currents that traverse in the same direction therethrough as indicated by arrows 36, 37. The first and second conductors 34, 35 are coupled to respective first ends of the two magnetoresistive elements 31,32. A third conductor 40 is disposed between the two magnetoresistive elements 31, 32 at the respective ends ends thereof opposite to the location of the first and second conductors 34, 35. The third conductor 40 is electrically coupled to the two magnetoresistive elements 31, 32 and is oriented in a direction transverse to the direction thereof.

The third conductor 40 is adapted to conduct current therethrough in a direction indicated by the encircled cross 41 shown in FIG. 3 and arrow 42 in FIG. 4. This current is adapted to produce a longitudinal field H in the two magnetoresistive elements 31, 32 as indicated to the dashed arrows 43 in FIG. 3. Consequently, sense and bias currents conducted through the third conductor 40 are adapted to produce a longitudinal field 43 that is in opposite directions in each of the two magnetoresistive elements 31, 32. Initialization of the magnetoresistive sensor 30 into an antiparallel state occurs due to the combined effects of the transverse field provided by the write coil excitation (not shown), and the longitudinal field 43 provided by the third conductor 40. This antiparallel alignment of the fields favors a single domain state because the closure between the two magnetoresistive elements 31, 32 at their ends. During reading, the longitudinal field stabilizes the single domain state against perturbations caused by fields from a recording disc being read.

Figure 5:
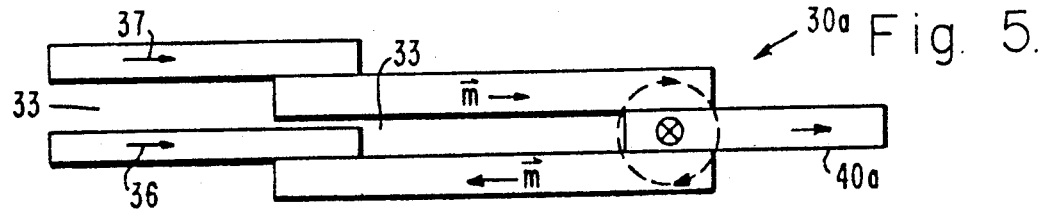
FIGS. 5 and 6 show side and top views, respectively, of an alternative dual element magnetoresistive sensor that provides initializing current and/or sense current in accordance with the principles of the present invention.
Figure 6:
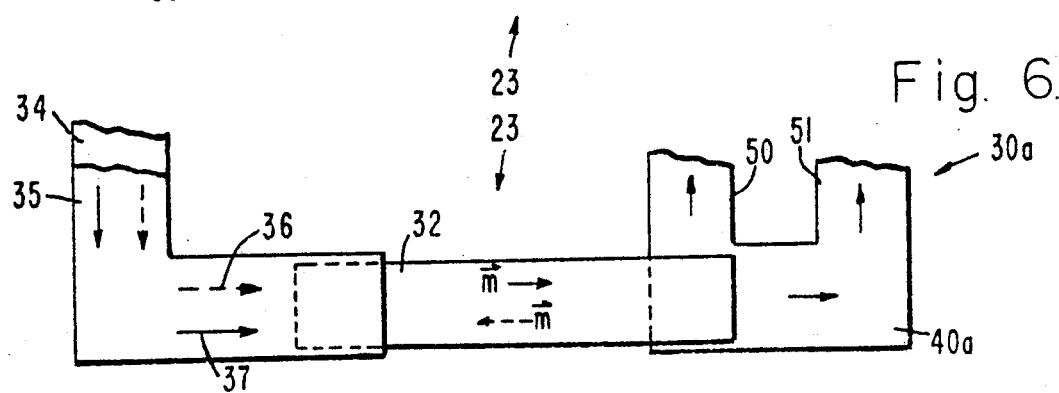

FIG. 5 shows a top view of an alternative dual element magnetoresistive sensor 30a in accordance with the principles of the present invention that provides initializing current and/or sense current. This dual element magnetoresistive sensor 30a employs an alternative third conductor 40a. The third conductor 40a comprises two conductor portions 50, 51 arranged as shown in FIG. 5. An initialization conductor portion 50 provides a current distribution that is similar to that described above with reference to the third conductor 40 of FIGS. 3 and 4. This current is adapted to initialize the sensor 30a. A sense current conductor portion 51 is adapted for use during reading and provides a current distribution that is similar to the current distribution provided by the first and second conductors 34, 35 disposed on the other side of the active area 23, or track. This ensures that cross track response is symmetric. A small fraction of the sense current may be caused to flow in the initialization conductor portion 50 to provide for stabilization of the sensor 30a during reading.

In operation, the period of time during which the initialization occurs is kept quite small due to the fast response of the magnetoresistive elements 31, 32. This reduces degradation of the magnetoresistive elements 31, 32 or the conductors 34, 35, 40 due to thermal effects or to electrical migration. Also, larger initialization fields may be employed than are conventionally achieved during normal read operation.

The length of each magnetoresistive element 31, 32 is determined by the requirement that the longitudinal bias field must initialize the entire element 31, 32. During initialization the magnetization in a particular element comprises an effective field that is a combination of the longitudinal bias field, the transverse field from write coils, the field from the adjacent magnetoresistive element, the exchange field from neighboring magnetizations, the closure field from the end of the magnetoresistive element and the demagnetizing field caused by the shape of the magnetoresistive elements. These fields vary strongly across the length of the magnetoresistive elements 31, 32 and the proper design is determined by both modeling and experimentation. The following design constraints apply.

The sense/bias current applies a longitudinal field at the ends of the magnetoresistive elements 31, 32 to stabilize this region. The lengths of the magnetoresistive elements 31, 32 are such that they will not extend beyond the outer edge of the current conductors 34, 35. In addition to the increased ability to initialize and stabilize, this is also desirable from the standpoint of track width definition and across-the-track pickup, features that are a source of uncertainty in conventional designs that use relatively long magnetoresistive elements. The width of the region over which the transverse field is strong enough to rotate the magnetization perpendicular to the easy axis of the sensor 30, 30a is comparable to the write track width. To initialize the magnetoresistive elements 31, 32, a significant fraction of the magnetization is disposed in this region.

Since the longitudinal field is inversely proportional to the width of a conductor 34, 35, the present invention provides for a longitudinal field of sufficient strength to effectively initialize and stabilize the magnetoresistive elements. This requires that the third conductor 40 be relatively narrow, typically between 14 and 66 microns for a track width of 6 microns. The magnetoresistive elements 31, 32 are made long enough so that any domains that might inadvertently at their ends due to corners or edge irregularities are kept away from the active region 23.

The present invention is such that the design of the magnetoresistive elements 31, 32 and sense/bias conductors 40 allow them to be self-initialized into a single domain state during normal operation of a disc drive incorporating them. The antiparallel longitudinal field produced by the sense/bias current in the third conductor 40 is in the same direction as the closure fields in the dual element magnetoresistive sensor 30. These fields ensure that the single domain state is produced in the magnetoresistive elements 31, 32 which leads to enhanced stability and initialization capability. The reduction of end domains enables relatively short magnetoresistive elements 31, 32 to be employed. These relatively short magnetoresistive elements 31, 32 provide the capability to control track width definition and cross track pickup in high density disc drives.

Thus there has been described new and improved dual element magnetoresistive sensors that use the longitudinal field produced by sense/bias currents to initialize the magnetoresistive elements into a stable antiparallel state. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A dual element magnetoresistive sensor comprising:
   first and second parallel magnetoresistive sensor elements separated by dielectric material, wherein each sensor element has a coupling area;
   first and second conductors respectively coupled to one end of the first and second magnetoresistive sensor elements, and wherein each conductor has a coupling area that is oriented in the same direction as the coupling areas of the respective sensor elements, and wherein each conductor is adapted to conduct currents through its respective coupling area that are in the same direction as the orientation of the respective sensor element coupled thereto;
   a third conductor disposed at the opposite ends of the first and second magnetoresistive sensor elements that is coupled to both sensor elements and oriented transverse to the directions of the first and second sensor elements, and that is adapted to conduct current therethrough in a direction transverse to the orientation of the sensor elements coupled thereto;
   whereby the current flowing in the third conductor creates an anti-parallel longitudinal field in the two sensor elements that is in the same direction as closure fields produced by the magnetostatic coupling between the first and second sensor elements, and whereby currents conducted by the first, second and third conductors self-initializes the magnetoresistive sensor into a single domain state.

2. The dual element magnetoresistive sensor of claim 1 wherein the third conductor comprises:
   an initializing current conductor portion coupled between the first and second magnetoresistive sensor elements, and oriented transverse to the directions of the first and second sensor elements, and adapted to conduct initializing and stabilizing currents therethrough in a direction transverse to the currents conducted by the first and second conductors in their coupling areas; and a sense current conductor portion coupled to the initializing current conductor portion, and adapted to conduct sense current therethrough parallel to the direction of the currents conducted by the first and second conductors and away from an active area of the sensor defined by the area between the edges of the first and second conductors and the adjacent edge of the third conductor.

* * * * *